(12) United States Patent
Zhu

(10) Patent No.: US 9,727,624 B2
(45) Date of Patent: Aug. 8, 2017

(54) ACTIVE REPLICATION WITH GENERIC CONFLICT DETECTION AND RESOLUTION (CDR)

(71) Applicant: Oracle International Corporation, Redwood Shores, CA (US)

(72) Inventor: Zhenyu Zhu, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 700 days.

(21) Appl. No.: 14/064,382

(22) Filed: Oct. 28, 2013

(65) Prior Publication Data

US 2014/0250071 A1    Sep. 4, 2014

Related U.S. Application Data

(60) Provisional application No. 61/771,232, filed on Mar. 1, 2013.

(51) Int. Cl.
*G06F 17/30* (2006.01)
*G06F 11/20* (2006.01)

(52) U.S. Cl.
CPC .... *G06F 17/30575* (2013.01); *G06F 11/2035* (2013.01); *G06F 11/2097* (2013.01); *G06F 17/30339* (2013.01); *G06F 11/2048* (2013.01)

(58) Field of Classification Search
CPC ......... G06F 17/30067; G06F 17/30575; G06F 17/30212
USPC .......................................................... 707/634
See application file for complete search history.

(56) References Cited

U.S. PATENT DOCUMENTS

| | | | |
|---|---|---|---|
| 8,977,591 B1* | 3/2015 | Syed ................. | G06F 17/30575 707/612 |
| 2002/0188610 A1* | 12/2002 | Spencer, Jr. ...... | G06F 17/30893 |
| 2005/0055382 A1* | 3/2005 | Ferrat ............... | G06F 17/30575 |
| 2014/0365437 A1* | 12/2014 | Srinivasan ........ | G06F 17/30575 707/634 |
| 2014/0372374 A1* | 12/2014 | Bourbonnais ..... | G06F 17/30575 707/613 |

* cited by examiner

*Primary Examiner* — Scott A Waldron
*Assistant Examiner* — Dongming Wang
(74) *Attorney, Agent, or Firm* — Kilpatrick Townsend & Stockton LLP

(57) ABSTRACT

In various embodiments, an active-active replication solution is provided with one generic PL/SQL stored procedure (e.g., a PL/SQL stored procedure) configured to handle all application tables' conflict detection and resolution. In various aspects, the generic stored procedure simplifies initial setup, maintenance and management of complex mission critical active-active replication projects.

23 Claims, 7 Drawing Sheets

|     |                   |                                                                                         |
| --- | ----------------- | --------------------------------------------------------------------------------------- |
|     | Location          | City1                                                                                   |
|     | Hostname (IP)     | serv1, serv2                                                                            |
|     | OS Platform info  | HP-UX 11.31 ia64, 16 CPU, and 40G RAM                                                   |
|     | OGG Ports         | 7809                                                                                    |
|     | Oracle Version    | 11.2.0.2                                                                                |
|     | RAC w/wo ASM      | RAC with ASM                                                                            |
|     | Database Name     | ORCL                                                                                    |
|     | Redo log info     | 2x2x4x512M                                                                              |
|     | Redo log Volume   | Max: 150GB/day, Average: ~100GB/day                                                     |
| DC1 | Applications      | Your application                                                                        |
|     | Schema            | List schemas                                                                            |
|     | Tables to include | All tables included is from a master Excel file and stored in golden.ogg_replication table |
|     | OGG Version       | 11.1.1.1.2                                                                              |
|     | OGG HOME          | /u02/golden/bin                                                                         |
|     | OGG Trail         | /u02/golden/trail/                                                                      |
|     | OGG OS User       | oracle                                                                                  |
|     | OGG DB User       | golden                                                                                  |
|     | Location          | City2                                                                                   |
|     | Hostname (IP)     | serv3, serv4                                                                            |
|     | OS Platform info  | HP-UX 11.31 ia64, 16 CPU, and 40G RAM                                                   |
|     | OGG Ports         | 7809                                                                                    |
|     | Oracle Version    | 11.2.0.2                                                                                |
|     | RAC w/wo ASM      | RAC with ASM                                                                            |
| DC2 | Database Name     | ORCL                                                                                    |
|     | Redo log info     | 2x2x4x512M                                                                              |
|     | Redo log Volume   | Max: 150GB/day, Average: ~100GB/day                                                     |
|     | Applications      | Your application                                                                        |
|     | Schema            | List your schemas                                                                       |
|     | Tables to include | All tables included is from a master Excel file and stored in golden.ogg_replication table |
|     | OGG Version       | 11.1.1.1.2                                                                              |
|     | OGG HOME          | /u02/golden/bin                                                                         |
|     | OGG Trail         | /u02/golden/trail/                                                                      |

FIG. 4

ACTIVE REPLICATION WITH GENERIC CONFLICT DETECTION AND RESOLUTION (CDR)

CROSS-REFERENCE TO RELATED APPLICATIONS

This Application the benefit of and priority to U.S. Provisional Patent Application No. 61/771,232, filed Mar. 1, 2013, and entitled "ACTIVE REPLICATION WITH GENERIC CONFLICT DETECTION AND RESOLUTION (CDR)," the entire disclosure or which is incorporated herein by reference for all purposes.

BACKGROUND OF THE INVENTION

One key objective for any IT organization is to create software applications and a database infrastructure that can scale to meet growing and changing business needs. With business processes increasingly migrating to digital transactions, there is a growing organizational reliance and dependence on the IT group's ability to handle larger volumes of data and users, with less system downtime. Active-active configurations, which distributes database transactions across multiple databases, provide significant performance and scalability benefits; deliver exceptional high-availability; and enable continuous operations for not only unplanned interruptions but also planned outages such as migrations, upgrades, and systems maintenance.

In most cases, active-active replication configurations are considered to be part of a continuous availability—not a disaster recovery—plan. At the high end of traditional disaster recovery plans, there are solutions that offer an active-passive configuration where the active system assumes all the workload, but when it fails, the passive system becomes active and assumes the full workload. Under normal operating conditions, the secondary (passive) system doesn't contribute to handling the data processing load; it is twice the investment to provide the same amount of processing power as a single system. By comparison, an active-active replication configuration not only facilitates very high levels of recovery point and recovery time objectives, but it also returns value on the investment by adding capacity, flexibility, and higher performance to the operational data infrastructure.

Implementing an effective active-active replication configuration requires a thorough consideration of technologies available for enabling the data movement and sharing between the database instances. Before moving forward, an organization must understand the different use cases for active-active replication configurations and the challenges and benefits of each configuration. They must also understand the different methods for detecting data conflicts that occur and how to effectively resolve those conflicts.

However, implementing an active-active replication solution is not trivial. One key to success lies in real-time data movement, conflict detection and resolution, and support for heterogeneous environments. Of the three, conflict detection and resolution introduces the most complexity. In prior conflict detection and resolution (CDR) approaches, organizations needed to use either a table specific Query or a PL/SQL Procedure to resolve data conflict. For example, the table_name, column_name, etc is hard coded into each QUERY or Procedure.

Accordingly, what is desired is to solve problems relating to active-active replication, some of which may be discussed herein. Additionally, what is desired is to reduce drawbacks relating to conflict detection and resolution, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In various embodiments, an active-active replication solution is provided with one generic PL/SQL stored procedure (e.g., a PL/SQL stored procedure) configured to handle all application tables' conflict detection and resolution. In various aspects, the generic stored procedure simplifies initial setup, maintenance and management of complex mission critical active-active replication projects.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

FIG. 4 is a table providing configuration details of the design of FIG. 3.

DETAILED DESCRIPTION OF THE INVENTION

Figure 1:
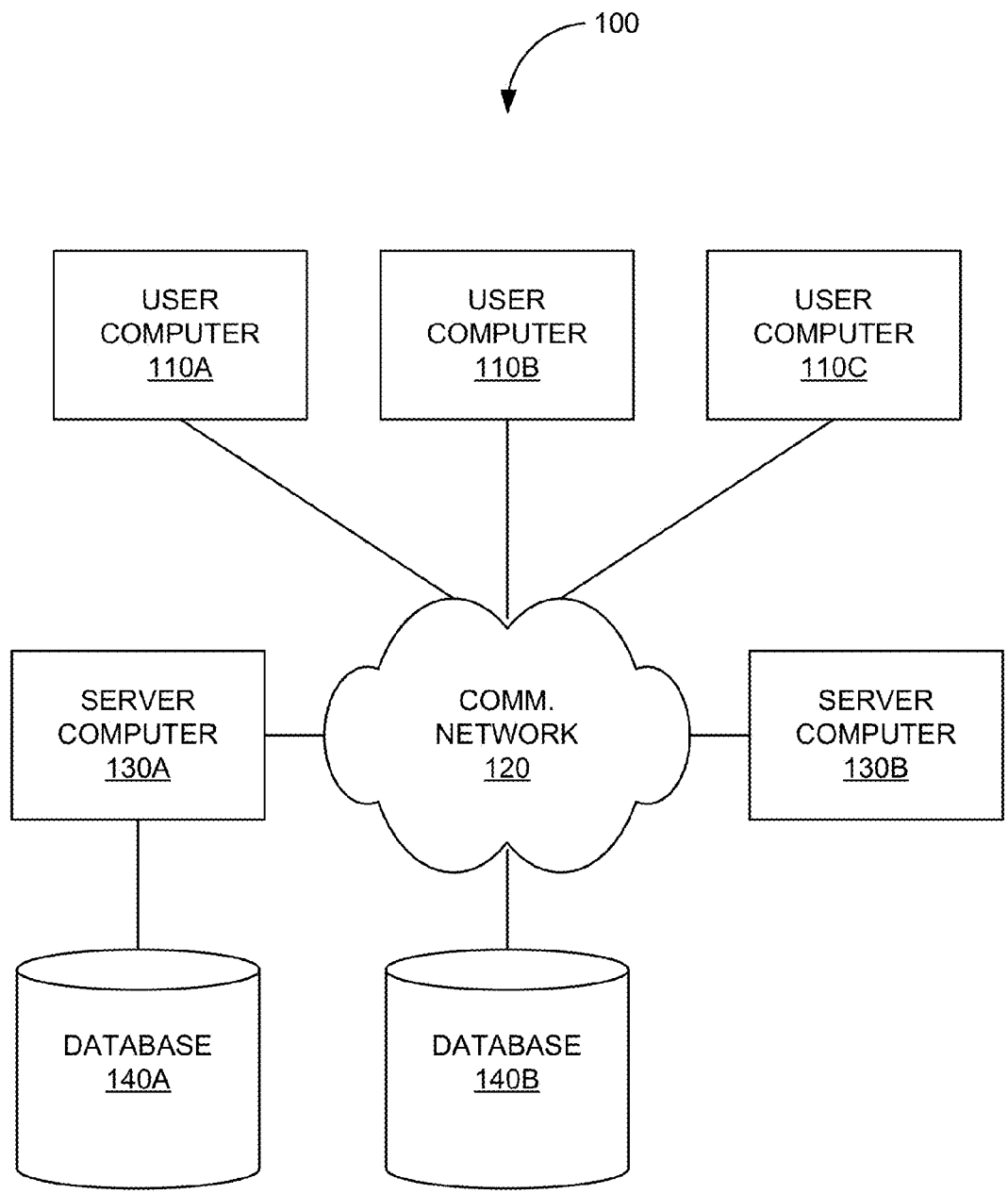
FIG. 1 is a simplified illustration of a system that may incorporate an embodiment of the present invention.

FIG. 1 is a simplified illustration of system 100 that may incorporate an embodiment or be incorporated into an embodiment of any of the innovations, embodiments, and/or examples found within this disclosure. FIG. 100 is merely illustrative of an embodiment incorporating the present invention and does not limit the scope of the invention as recited in the claims. One of ordinary skill in the art would recognize other variations, modifications, and alternatives.

In one embodiment, system 100 includes one or more user computers 110 (e.g., computers 110A, 110B, and 110C). User computers 110 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 110 can also have any of a variety of applications, including one or more applications configured to perform methods of the invention, as well as one or more office applications, database client and/or server applications, and web browser applications.

Alternatively, user computers 110 can be any other electronic device, such as a thin-client computer, Internet-enabled mobile telephone, and/or personal digital assistant, capable of communicating via a network (e.g., communications network 120 described below) and/or displaying and navigating web pages or other types of electronic documents. Although the exemplary system 100 is shown with three user computers, any number of user computers or devices can be supported.

Certain embodiments of the invention operate in a networked environment, which can include communications network 120. Communications network 120 can be any type of network familiar to those skilled in the art that can support data communications using any of a variety of commercially-available protocols, including without limitation TCP/IP, SNA, IPX, AppleTalk, and the like. Merely by way of example, communications network 120 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 130 (e.g., computers 130A and 130B). Each of server computers 130 may be configured with an operating system including without limitation any of those discussed above, as well as any commercially-available server operating systems. Each of server computers 130 may also be running one or more applications, which can be configured to provide services to one or more clients (e.g., user computers 110) and/or other servers (e.g., server computers 130).

Merely by way of example, one of server computers 130 may be a web server, which can be used, merely by way of example, to process requests for web pages or other electronic documents from user computers 110. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 110 to perform methods of the invention.

Server computers 130, in some embodiments, might include one ore more file and or/application servers, which can include one or more applications accessible by a client running on one or more of user computers 110 and/or other server computers 130. Merely by way of example, one or more of server computers 130 can be one or more general purpose computers capable of executing programs or scripts in response to user computers 110 and/or other server computers 130, including without limitation web applications (which might, in some cases, be configured to perform methods of the invention).

Merely by way of example, a web application can be implemented as one or more scripts or programs written in any programming language, such as Java, C, or C++, and/or any scripting language, such as Perl, Python, or TCL, as well as combinations of any programming/scripting languages. The application server(s) can also include database servers, including without limitation those commercially available from Oracle, Microsoft, IBM and the like, which can process requests from database clients running on one of user computers 110 and/or another of server computers 130.

In some embodiments, an application server can create web pages dynamically for displaying the information in accordance with embodiments of the invention. Data provided by an application server may be formatted as web pages (comprising HTML, XML, Javascript, AJAX, etc., for example) and/or may be forwarded to one of user computers 110 via a web server (as described above, for example). Similarly, a web server might receive web page requests and/or input data from one of user computers 110 and/or forward the web page requests and/or input data to an application server.

In accordance with further embodiments, one or more of server computers 130 can function as a file server and/or can include one or more of the files necessary to implement methods of the invention incorporated by an application running on one of user computers 110 and/or another of server computers 130. Alternatively, as those skilled in the art will appreciate, a file server can include all necessary files, allowing such an application to be invoked remotely by one or more of user computers 110 and/or server computers 130. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 100 can include one or more databases 140 (e.g., databases 140A and 140B). The location of the database(s) 140 is discretionary: merely by way of example, database 140A might reside on a storage medium local to (and/or resident in) server computer 130A (and/or one or more of user computers 110). Alternatively, database 140B can be remote from any or all of user computers 110 and server computers 130, so long as it can be in communication (e.g., via communications network 120) with one or more of these. In a particular set of embodiments, databases 140 can reside in a storage-area network ("SAN") familiar to those skilled in the art. (Likewise, any necessary files for performing the functions attributed to user computers 110 and server computers 130 can be stored locally on the respective computer and/or remotely, as appropriate). In one set of embodiments, one or more of databases 140 can be a relational database that is adapted to store, update, and retrieve data in response to SQL-formatted commands. Databases 140 might be controlled and/or maintained by a database server, as described above, for example.

Real-Time, Logical Data Replication

In some embodiments, system 100 provides real-time, logical data replication capabilities to move data across heterogeneous IT environments with sub-second speed. System 100 may include an application platform that consists of decoupled modules that can be combined across systems to provide maximum flexibility, modularity, and performance.

System 100 provides an asynchronous solution with synchronous like behavior. Replication can be setup independently for each database of FIG. 1. In various embodiments, an active-active replication solution is provided with one generic PL/SQL stored procedure (e.g., a PL/SQL stored procedure) configured to handle all application tables' conflict detection and resolution. In various aspects, the generic stored procedure simplifies initial setup, maintenance and management of complex mission critical active-active replication projects.

In one aspect, this approach can be used for many types of replication setups depending on a customer's business goals/requirements. They include reporting, HA/DR, data consolidation, data distribution, real time DW/ODS when coupled with Oracle Data Integrator (ODI) and active-active (also can be called, master-master, or peer-peer) involving two or more data centers. The active-active replication has two different subtypes: "with no data conflict" and "with data conflict". A GENERIC approach is used such that the coding is not specific to a database object and data type. This approach can essentially be used for any application as long as the application meets the common CDR prerequisites and for any number of tables. In theory the number of tables is unlimited.

Figure 2:
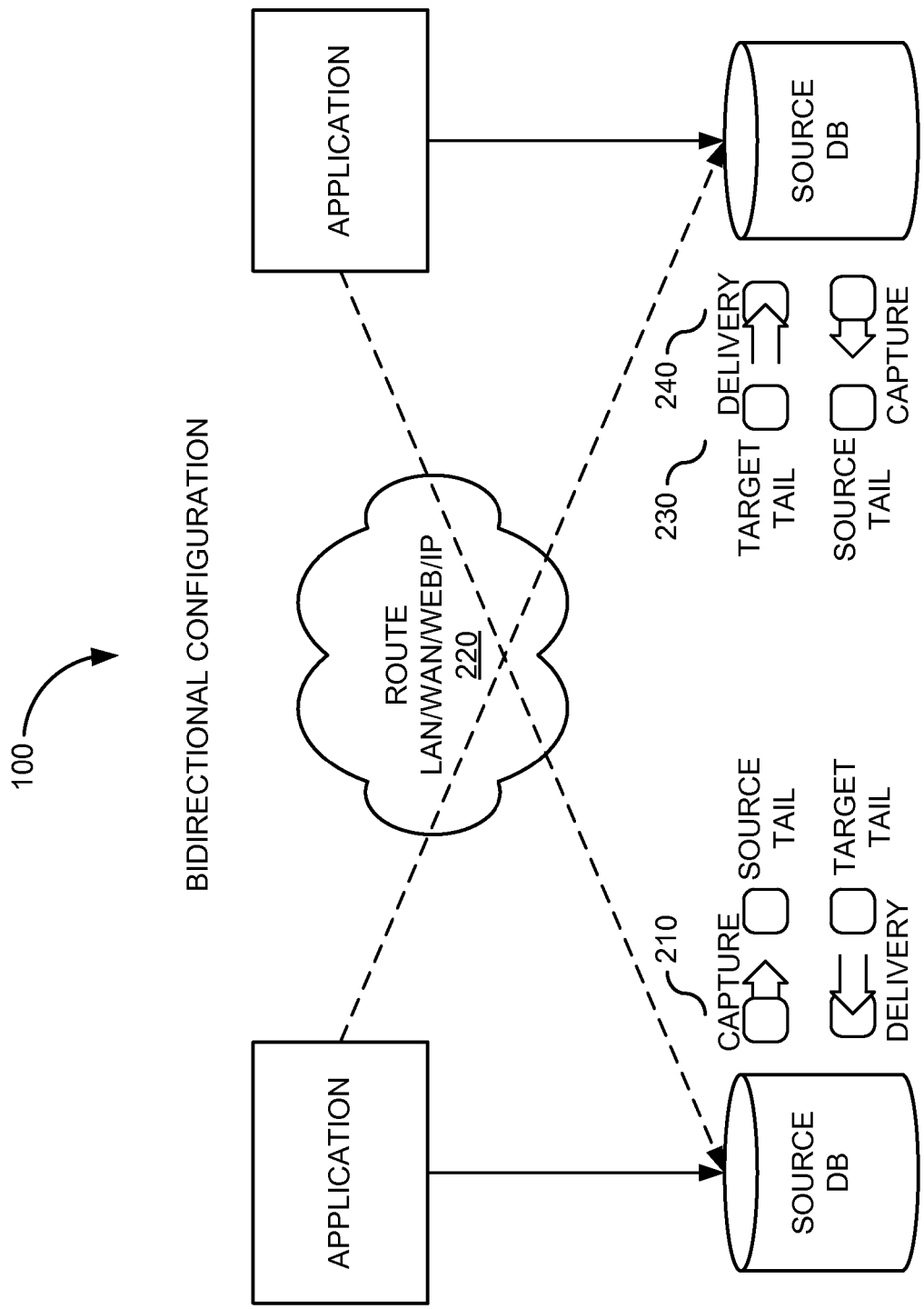
FIG. 2 is an illustration of a bidirectional configuration of system 100 in FIG. 1 in one embodiment.

FIG. 2 is an illustration of a bidirectional configuration of system 100 in FIG. 1 in one embodiment. In this example, system 100 enables multidirectional data replication to support an active-passive (DR) or even active-active (master-master) application configuration. This architecture facilitates the movement and management of transactional data in four simple, yet powerful steps.

Capture Step 210—System 100 provides change data capture technology that identifies and replicates data changes from database redo log files in real time using a non-intrusive, high-performance, low-overhead approach.

Route Step 220—Once captured, system 100 passes changed data transactions in queue files (called Trail Files). The data transactions can be delivered to any data Secondary including message queues.

Enhance Step 230—To optimize performance and data management capabilities, at any point prior to delivering changed data from the host to a Secondary system, system 100 can execute a number of built-in functions, such as filtering and transformation.

Apply Step 240—System 100 can apply changed data to multiple Secondary systems with sub-second latency to ensure transaction integrity with features for conflict detection and resolution.

Figure 3:
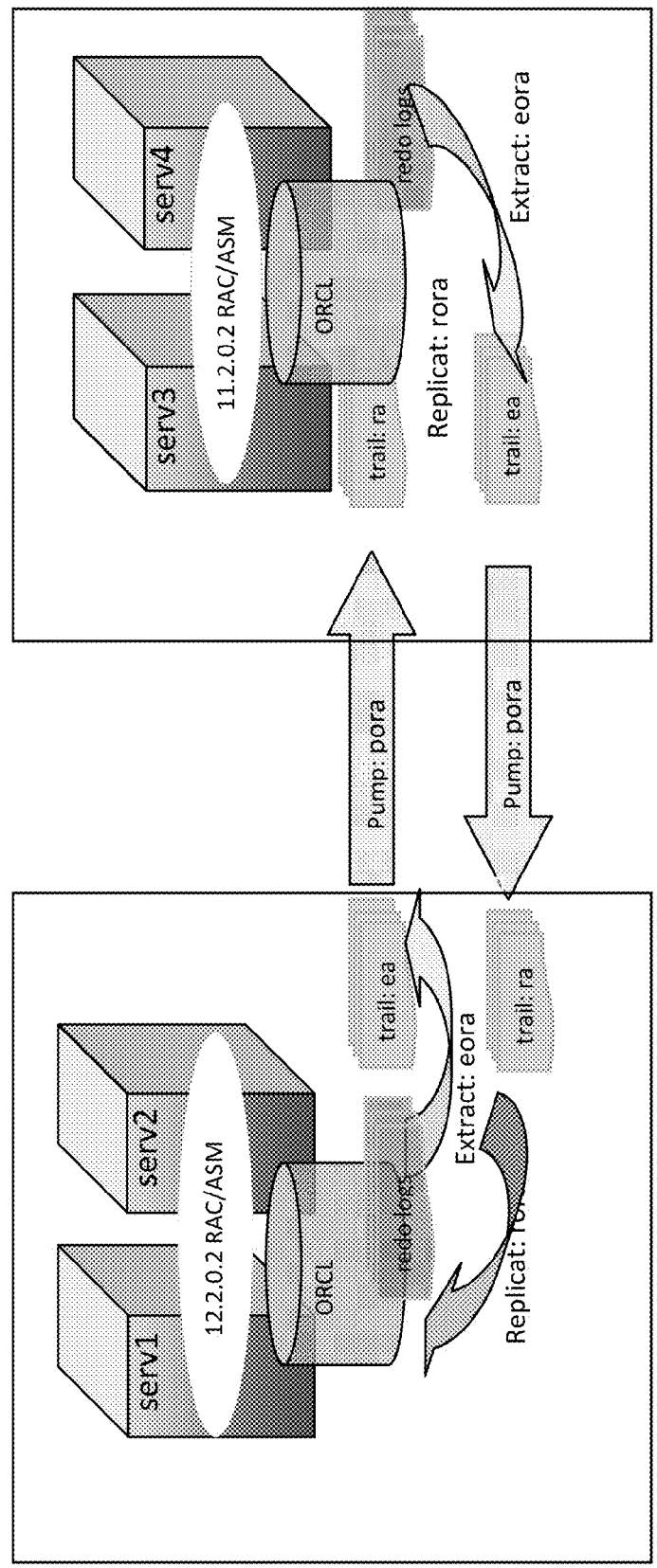
FIG. 3 is an illustration of an exemplary design for system 100 in FIG. 1 in one embodiment.

FIG. 3 is an illustration of an exemplary design for system 100 in FIG. 1 in one embodiment. In this example, replication has been set up for serv1 and serv2 utilizing an ORCL database. Change data capture identifies and replicates data changes from database redo log files. The change data is extracted and placed into one or more trail files. The trail files are routed for replication with ORCL database associated with serv3 and serv4. To optimize performance and data management capabilities, at any point prior to delivering changed data from the host to ORCL database associated with serv3 and serv4, a number of built-in functions, such as filtering and transformation, may be executed against the data. The changed data can be applied to the ORCL database associated with serv3 and serv4. The process can be reversed allowing conflict detection and resolution in the opposite direction.

FIG. 4 is a table providing configuration details of the design of FIG. 3.

Figure 5:
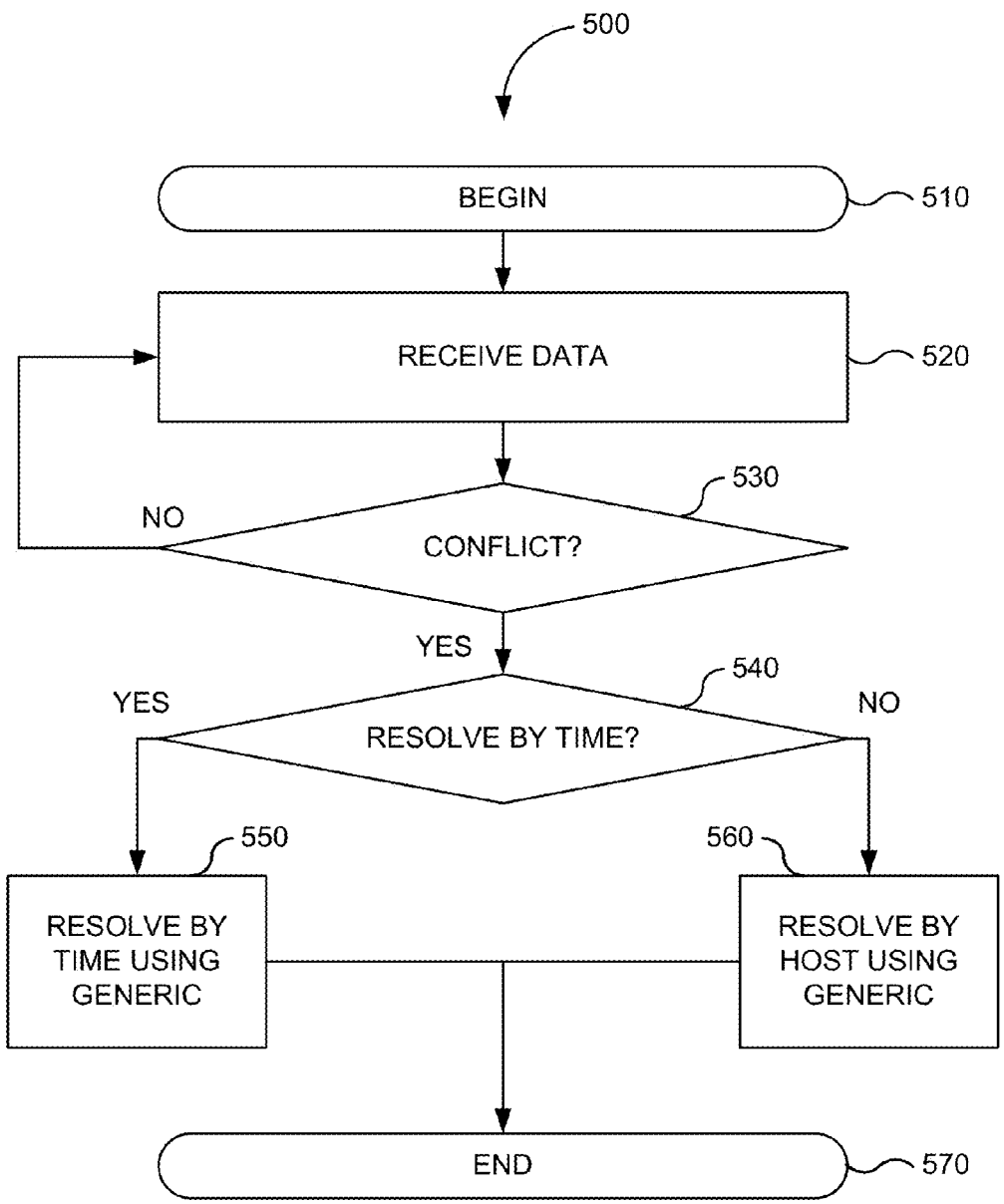
FIG. 5 is a simplified flowchart of a method for generic conflict detection and resolution (CDR) in on embodiment.

FIG. 5 is a simplified flowchart of method 500 for generic conflict detection and resolution (CDR) in one embodiment. Implementations of or processing in method 500 depicted in FIG. 5 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 500 depicted in FIG. 5 begins in step 510.

In step 520, data is received. In step 530, a determination is made whether there is a conflict. A conflict may include a situation where the received data exists on one host and not another. In another example, a conflict may include a situation where the received data represents changed data such that changes to the data need to be reflected in another repository.

If a determination is made that there is no conflict, method 500 ends in step 570. If a determination is made that there is a conflict, in step 540, a determination is made whether the conflict can be resolved based on time. For example, each table to be replicated may directly or indirectly have a timestamp or a date column that is used to resolve conflicts. Other time-related metadata may be used to determine how to resolve a conflict.

If a determination is made that the conflict cannot be resolved by time, in step 560, the conflict is resolved by host. For example, one or more hosts may be given a preference or priority that can be used to resolve conflicts. Other host-related metadata may be used to determine how to resolve a conflict. FIG. 5 ends in step 570.

Figure 6:
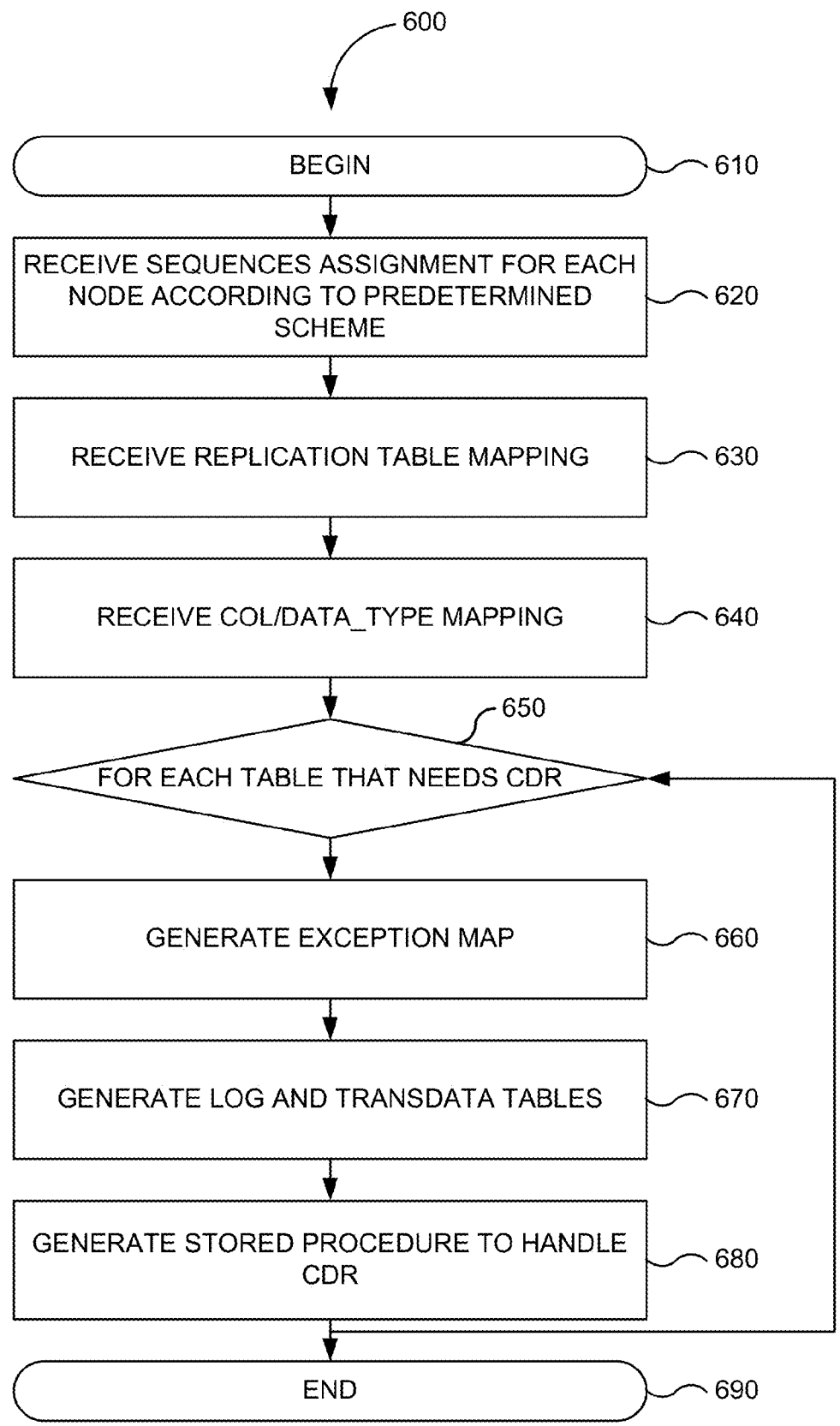
FIG. 6 is a simplified flowchart of a method for generating a stored procedure implementing a generic conflict detection and resolution process in one embodiment.

FIG. 6 is a simplified flowchart of method 600 for generating a stored procedure implementing a generic conflict detection and resolution process in one embodiment. Implementations of or processing in method 600 depicted in FIG. 6 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 600 depicted in FIG. 6 begins in step 610.

In step 620, sequences assignments are received for each node/host according to a predetermined scheme. For example, each host may be assigned to an "ODD" or "EVEN" scheme.

In step 630, a replication table mapping is received. The replication table mapping specifies which tables are to be part of a CDR process. The replication table mapping further may specify additional metadata such as identifying primary keys and triggers (e.g., associated with a timestamp column).

In step 640, a column/data type mapping is received. The column/data type mapping improves CDR performance reducing expensive queries such as joining dictionary views when CDR is invoked.

In step 650, a process is repeated for each table that needs CDR. This may include generating one or more tables, maps, or other metadata that facilitate generic CDR.

In step 660, an exception map is generated for a table. In one embodiment, the exception map configures how to resolve data conflict and insert conflicting data into exception logging.

In step 670, log and transdata tables are generated. In some embodiments, these tables are used to exception logging and supplemental logging.

In step 680, a stored procedure is generated to handle CDR. FIG. 6 ends in step 680.

Figure 7:
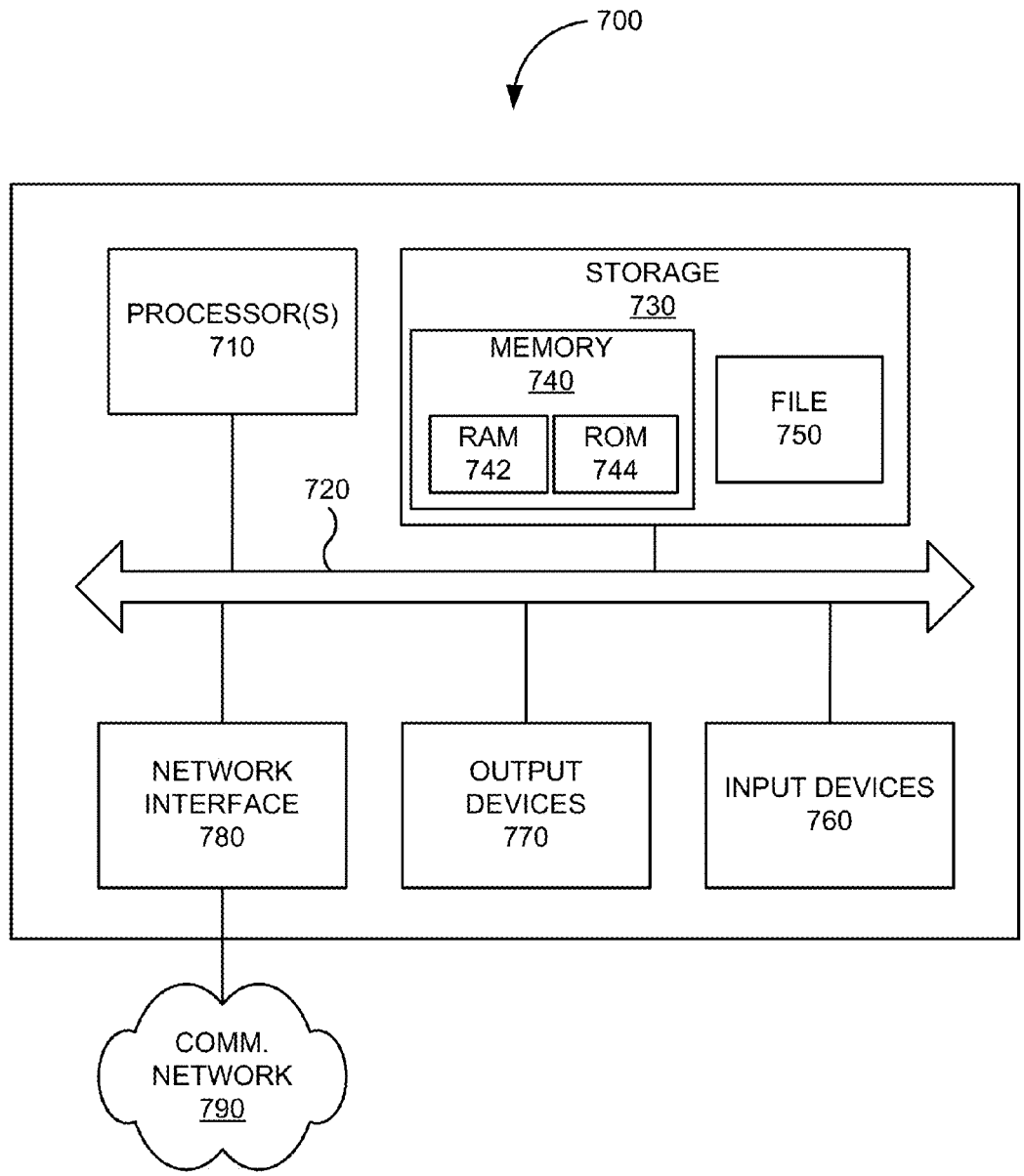
FIG. 7 is a simplified block diagram of a computer system that may be used to practice embodiments of the present invention.

FIG. 7 is a simplified block diagram of computer system 700 that may be used to practice embodiments of the present invention. As shown in FIG. 7, computer system 700 includes processor 710 that communicates with a number of peripheral devices via bus subsystem 720. These peripheral devices may include storage subsystem 730, comprising memory subsystem 740 and file storage subsystem 750, input devices 760, output devices 770, and network interface subsystem 780.

Bus subsystem 720 provides a mechanism for letting the various components and subsystems of computer system 700 communicate with each other as intended. Although bus subsystem 720 is shown schematically as a single bus, alternative embodiments of the bus subsystem may utilize multiple busses.

Storage subsystem 730 may be configured to store the basic programming and data constructs that provide the functionality of the present invention. Software (code modules or instructions) that provides the functionality of the present invention may be stored in storage subsystem 730. These software modules or instructions may be executed by processor(s) 710. Storage subsystem 730 may also provide a repository for storing data used in accordance with the present invention. Storage subsystem 730 may comprise memory subsystem 740 and file/disk storage subsystem 750.

Memory subsystem 740 may include a number of memories including a main random access memory (RAM) 742 for storage of instructions and data during program execution and a read only memory (ROM) 744 in which fixed instructions are stored. File storage subsystem 750 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Input devices 760 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 700.

Output devices 770 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 700.

Network interface subsystem 780 provides an interface to other computer systems, devices, and networks, such as communications network 790. Network interface subsystem 780 serves as an interface for receiving data from and transmitting data to other systems from computer system 700. Some examples of communications network 790 are private networks, public networks, leased lines, the Internet, Ethernet networks, token ring networks, fiber optic networks, and the like.

Computer system 700 can be of various types including a personal computer, a portable computer, a workstation, a network computer, a mainframe, a kiosk, or any other data processing system. Due to the ever-changing nature of computers and networks, the description of computer system 700 depicted in FIG. 7 is intended only as a specific example for purposes of illustrating the preferred embodiment of the computer system. Many other configurations having more or fewer components than the system depicted in FIG. 7 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method of bi-directional replication of active databases, the method comprising:
   receiving, at one or more computer systems, information indicative of a conflict in a plurality of tables associated with a first database, wherein the conflict is an unsynchronized data conflict in an active-active replication configuration;
   for each of the plurality of tables, generating, with one or more processors associated with the one or more computer systems, information mapping that specifies how to resolve the conflict and identifies which conflicts are to be inserted into a generic logging table;
   generating, with the one or more processors associated with the one or more computer systems, a generic logging table including the conflicts based on the information mapping that identifies which conflicts are to be inserted into the generic logging table; and
   initiating, with the one or more processors associated with the one or more computer systems, a stored procedural language procedure for each table that utilizes the generic logging table to resolve conflicts.

2. The method of claim 1 wherein receiving the information indicative of a conflict in the plurality of tables associated with the first database comprises receiving a time-based indication.

3. The method of claim 1 wherein receiving the information indicative of a conflict in the plurality of tables associated with the first database comprises receiving a host-based indication.

4. The method of claim 1 wherein generating the information mapping which conflicts are to be inserted into the generic logging table comprises generating trail files based on changed transaction data.

5. The method of claim 4, wherein the trail files are files comprising changed data transactions and the trail files are configured to be routed for replication.

6. The method of claim 1 further comprising:
receiving, at one or more computer systems, information indicative of a conflict in a plurality of tables associated with a second database;
for each of the plurality of tables, generating, with one or more processors associated with the one or more computer systems, information mapping which conflicts are to be inserted into a generic logging table;
generating, with the one or more processors associated with the one or more computer systems, one or more generic logging tables; and
initiating, with the one or more processors associated with the one or more computer systems, a stored procedural language procedure for each table that utilizes the generic logging tables to resolve conflicts.

7. The method of claim 6, wherein the first database is a first database instance and the second database is a second database instance.

8. The method of claim 1 further comprising:
receiving, at the one or more computer systems, information assigning sequences to each one of a plurality of replication nodes; and
receiving, at the one or more computer systems, information mapping which tables of each replication node is to be replicated.

9. The method of claim 1, wherein the stored procedural language procedure is a generic stored procedure configured to handle conflict resolution for the plurality of tables.

10. The method of claim 1, wherein the conflict in the plurality of tables is a conflict that occurs during active-active replication.

11. The method of claim 1, wherein the stored procedural language procedure is a PL/SQL procedure.

12. A non-transitory computer-readable medium storing code executable by a processor of a computer system for bi-directional replication of active databases, the non-transitory computer-readable medium comprising:
code for receiving information indicative of a conflict in a plurality of tables associated with a first database, wherein the conflict is an unsynchronized data conflict in an active-active replication configuration;
code for generating, for each of the plurality of tables, information mapping that specifies how to resolve the conflict and identifies which conflicts are to be inserted into a generic logging table;
code for generating a generic logging table including the conflicts based on the information mapping that identifies which conflicts are to be inserted into the generic logging table; and
code for initiating a stored procedural language procedure for each table that utilizes the generic logging table to resolve conflicts.

13. The non-transitory computer-readable medium of claim 12 wherein the code for receiving the information indicative of a conflict in the plurality of tables associated with the first database comprises code for receiving a time-based indication.

14. The non-transitory computer-readable medium of claim 12 wherein the code for receiving the information indicative of a conflict in the plurality of tables associated with the first database comprises code for receiving a host-based indication.

15. The non-transitory computer-readable medium of claim 12 wherein the code for generating the information mapping which conflicts are to be inserted into the generic logging table comprises code for generating trail files based on changed transaction data.

16. The non-transitory computer-readable medium of claim 12 further comprising:
code for receiving information indicative of a conflict in a plurality of tables associated with a second database;
code for generation, for each of the plurality of tables, information mapping which conflicts are to be inserted into a generic logging table;
code for generating one or more generic logging tables; and
code for initiating a stored procedural language procedure for each table that utilizes the generic logging tables to resolve conflicts.

17. The non-transitory computer-readable medium of claim 12 further comprising:
code for receiving information assigning sequences to each one of a plurality of replication nodes; and
code for receiving information mapping which tables of each replication node is to be replicated.

18. A system for bi-directional replication of active databases, the system comprising:
a processor; and
a memory storing a set of instructions which when executed by the processor configure the processor to:
receive information indicative of a conflict in a plurality of tables associated with a first database, wherein the conflict is an unsynchronized data conflict in an active-active replication configuration;
generate, for each of the plurality of tables, information mapping that specifies how to resolve the conflict and identifies which conflicts are to be inserted into a generic logging table;
generate a generic logging table including the conflicts based on the information mapping that identifies which conflicts are to be inserted into the generic logging table; and
initiate a stored procedural language procedure for each table that utilizes the generic logging table to resolve conflicts.

19. The system of claim 18 wherein to receive the information indicative of a conflict in the plurality of tables associated with the first database the processor is configured to receive a time-based indication.

20. The system of claim 18 wherein to receive the information indicative of a conflict in the plurality of tables associated with the first database the processor is configured to receive a host-based indication.

21. The system of claim 18 wherein to generate the information mapping which conflicts are to be inserted into the generic logging table the processor is configured to generate trail files based on changed transaction data.

22. The system of claim 18 wherein the processor is further configured to:
receive information indicative of a conflict in a plurality of tables associated with a second database;
generate, for each of the plurality of tables, information mapping which conflicts are to be inserted into a generic logging table;
generate one or more generic logging tables; and
initiate a stored procedural language procedure for each table that utilizes the generic logging tables to resolve conflicts.

23. The system of claim 18 wherein the processor is further configured to:
receive information assigning sequences to each one of a plurality of replication nodes; and receive information mapping which tables of each replication node is to be replicated.

\* \* \* \* \*

UNITED STATES PATENT AND TRADEMARK OFFICE
CERTIFICATE OF CORRECTION

PATENT NO. : 9,727,624 B2
APPLICATION NO. : 14/064382
DATED : August 8, 2017
INVENTOR(S) : Zhenyu Zhu Page 1 of 1

It is certified that error appears in the above-identified patent and that said Letters Patent is hereby corrected as shown below:

In the Specification

Column 1, Line 8 – insert --claims-- after Application
Column 2, Line 45 – remove "on embodiment" replace with --"an embodiment"--
Column 2, Line 59 – remove "FIG. 100" replace with --"FIG. 1"--
Column 3, Line 62 – remove "one ore more" replace with --"one or more"--

Signed and Sealed this
Fifteenth Day of January, 2019

Andrei Iancu
*Director of the United States Patent and Trademark Office*